US012738724B2

(12) United States Patent
Miao et al.

(10) Patent No.: US 12,738,724 B2
(45) Date of Patent: Sep. 15, 2026

(54) PIPELINE STRUCTURE WITH CABLE FIXING FUNCTION

(71) Applicant: Bestone (Zhejiang) Safety Technology Co., Ltd., Zhejiang (CN)

(72) Inventors: Wentao Miao, Zhejiang (CN); Chenchao Hong, Zhejiang (CN); Yijia Zhang, Zhejiang (CN); Junhuo Hong, Zhejiang (CN); Hong Miao, Zhejiang (CN); Rongrong Dai, Zhejiang (CN); Wanqi Yu, Zhejiang (CN)

(73) Assignee: Bestone (Zhejiang) Safety Technology Co., Ltd., Zhejiang (CN)

( * ) Notice: Subject to any disclaimer, the term of this patent is extended or adjusted under 35 U.S.C. 154(b) by 350 days.

(21) Appl. No.: 18/586,456

(22) Filed: Feb. 24, 2024

(65) Prior Publication Data

US 2025/0202213 A1 Jun. 19, 2025

(30) Foreign Application Priority Data

Dec. 19, 2023 (CN) ......................... 202323471828.9

(51) Int. Cl.
*F16L 3/06* (2006.01)
*H02G 9/02* (2006.01)

(52) U.S. Cl.
CPC . *H02G 9/02* (2013.01); *F16L 3/06* (2013.01)

(58) Field of Classification Search
CPC ....... F16L 3/00; F16L 3/02; F16L 3/06; F16L 11/22; F16L 11/12; F16L 7/00; H02G 9/00; H02G 9/10; H02G 9/02
USPC .................................. 138/111, 114, 115, 116
See application file for complete search history.

(56) References Cited

U.S. PATENT DOCUMENTS 5,703,330 A * 12/1997 Kujawski .................. F16L 3/06 24/339
2011/0108150 A1* 5/2011 Renaud ............ F02M 35/10144 24/457

* cited by examiner

*Primary Examiner* — Aaron M Dunwoody
(74) *Attorney, Agent, or Firm* — JEEN IP LAW, LLC

(57) ABSTRACT

Provided is a pipeline structure with a cable fixing function. The pipeline structure includes a pipeline. At least one cable fixing member is arranged on an outer wall of the pipeline, and a cable clamping slot is formed in the at least one cable fixing member. According to the pipeline structure, the at least one cable fixing member is connected to the outer wall of the pipeline, and the pipeline and the at least one cable fixing member are pre-processed into an integrated structure. When the pipeline and a cable are laid in the same trench, the cable only needs to be quickly clamped into the cable clamping slot.

5 Claims, 3 Drawing Sheets

PIPELINE STRUCTURE WITH CABLE FIXING FUNCTION

CROSS-REFERENCE TO RELATED APPLICATION

This patent application claims the benefit and priority of Chinese Patent Application No. 2023234718289 filed with the China National Intellectual Property Administration on Dec. 19, 2023, the disclosure of which is incorporated by reference herein in its entirety as part of the present application.

TECHNICAL FIELD

The present disclosure relates to the technical field of pipelines, in particular to a pipeline structure with a cable fixing function.

BACKGROUND

In practical engineering, it is generally necessary to lay additional cables in the same trench together with the pipeline. In the traditional method, the cables are directly put near the pipeline before backfilling, or the cables are bound with the pipeline with ties or ropes before backfilling. The traditional method is not only ineffective, but also spends more construction costs and prolongs the construction period.

SUMMARY

The present disclosure aims to provide a pipeline structure with a cable fixing function, so as to solves the problem that an existing pipeline and a cable are laid in the same trench which is poor in effect, high in construction cost and long in construction period.

In order to solve the technical problem, the present disclosure adopts the following technical solution.

The present disclosure provides a pipeline structure with a cable fixing function. The pipeline structure includes a pipeline. At least one cable fixing member is arranged on an outer wall of the pipeline, and a cable clamping slot is formed in the at least one cable fixing member.

Furthermore, the outer wall of the pipeline is provided with colored strips at the positions near both ends of the pipeline.

Furthermore, the at least one cable fixing member includes a plurality of cable fixing members and the plurality of cable fixing members are distributed on the pipeline in a circumferential direction of the pipeline), and are arranged on the pipeline (1) at a plurality of angular positions of the pipeline (1) in one-to-one correspondence.

Furthermore, each of the plurality of cable fixing members is in a strip shape, and a cross section of each of the plurality of cable fixing members is in a trapezoid shape.

Compared with the prior art, the present disclosure has the following beneficial effects:

According to the pipeline structure, the at least one cable fixing member is connected to the outer wall of the pipeline, and the pipeline and the at least one cable fixing member are pre-processed into an integrated structure. When the pipeline and a cable are laid in the same trench, the cable only needs to be quickly clamped into the cable clamping slot, which is simple and convenient to operate, good in effect and high working efficiency, so that the construction period is shortened, and the construction cost is saved.

BRIEF DESCRIPTION OF THE DRAWINGS

The present disclosure is further described below in combination with the accompanying figures.

Figure 1:
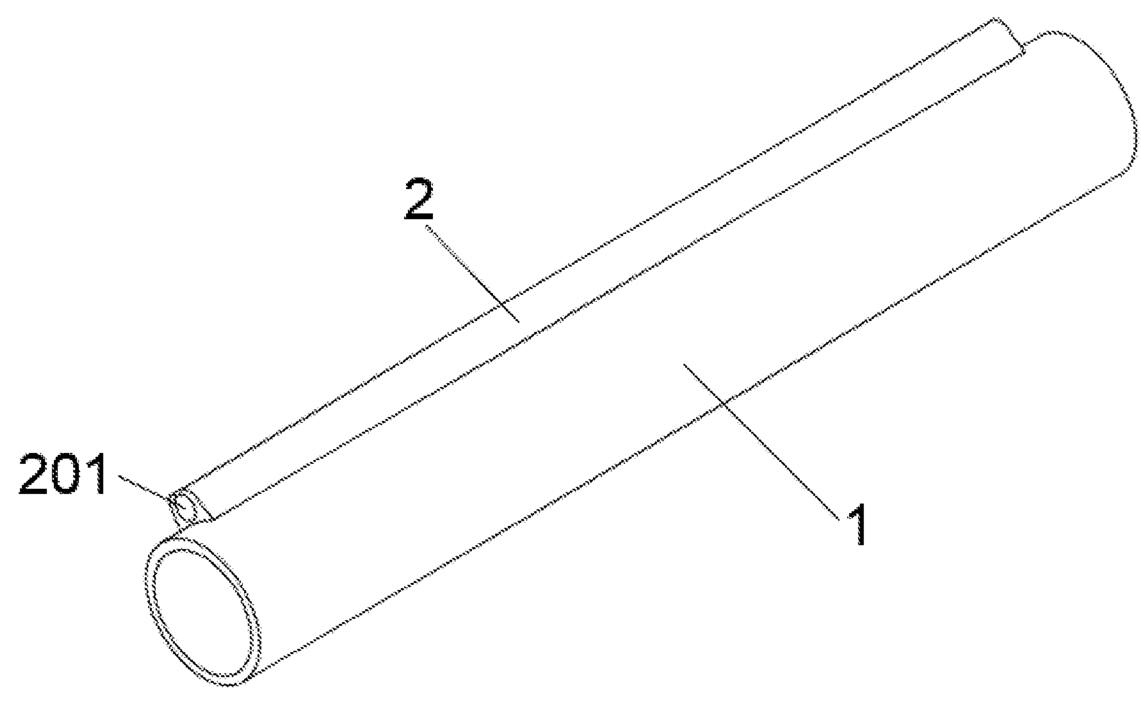
FIG. 1 is a stereoscopic structural schematic diagram of embodiment I according to the present disclosure.

Reference numerals: 1 pipeline; 2 cable fixing member; 201 cable clamping slot; and 202 clamping slot shoulder.

DETAILED DESCRIPTION OF THE EMBODIMENTS

Embodiment I

Figure 2:
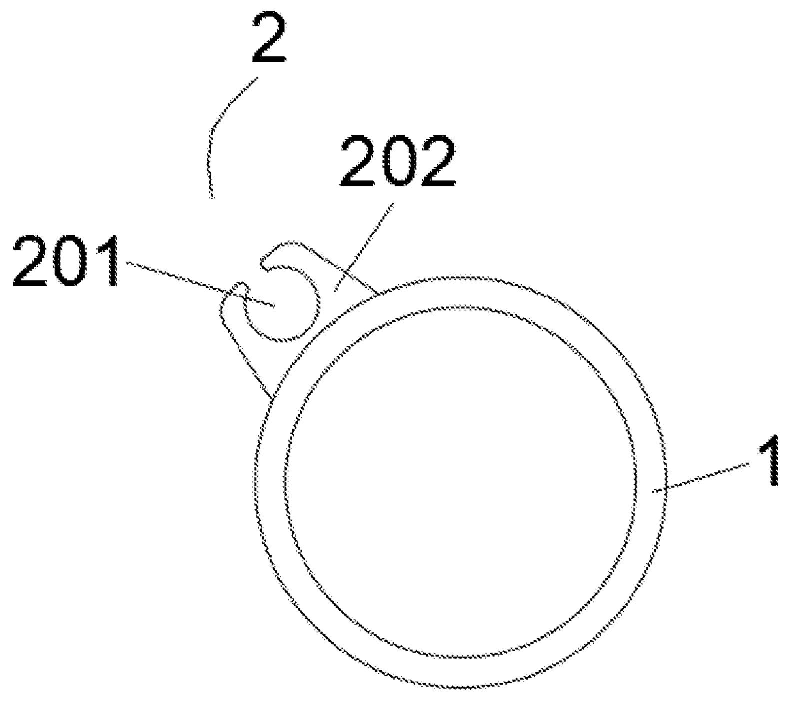
FIG. 2 is a front view of embodiment I according to the present disclosure.

As shown in FIG. 1 and FIG. 2, a pipeline structure with a cable fixing function includes a pipeline 1. A cable fixing member 2 is arranged on an outer wall of the pipeline 1, and a cable clamping slot 201 is formed in the cable fixing member 2. An opening is formed at the top of the cable clamping slot 201.

The outer wall of the pipeline 1 is provided with colored strips at the positions near both ends of the pipeline 1. The colored strips are formed by extruding wear-resistant and eye-catching color masterbatch on a wall of the pipeline, and the color masterbatch penetrates into the wall of the pipeline by 1.0 mm. The colored strips are configured for aligning the cable clamping slots 201 on a plurality of pipelines before the plurality of pipelines are connected to each other, so as to ensure that the cable clamping slots 201 on the plurality of pipelines are collinear.

The cable fixing member 2 is in a strip shape. The cross section of the cable fixing member 2 is in a trapezoidal shape. Only one cable fixing member 2 is connected to the pipeline 1 in a direction parallel to the axial direction of the pipeline 1, and the one cable fixing member 2 is connected to the pipeline 1 in the circumferential direction of the pipeline 1. The position directly above the axis of the pipeline 1 serves as 0 degree, and a left shoulder and a right shoulder are arranged on both sides of the pipeline 1, respectively. The one cable fixing member 2 is connected at a 45-degree position of the left shoulder or the right shoulder of the pipeline 1.

The pipeline structure in the embodiment may be made of nonmetallic materials, such as plastics. When a non-metallic pipeline is produced, an abrasive tool is designed. The cable fixing member 2 is synchronously extruded when the pipeline 1 is extruded by a plastic extruder. The cable fixing member 2 is a pipeline shoulder with an clamping slot having an opening. The size of the opening is slightly smaller than the inner diameter of the cable clamping slot 201. The diameter of the cable is slightly larger than that of the opening. For example, the diameter of the cable is 1 mm larger than the size of the opening, so that the cable can be quickly and conveniently clamped into the cable clamping slot 201 without popping out of the cable clamping slot 201 to realize the synchronous construction of the cable. The cable is clamped inside the cable fixing member 2, and the cable fixing member 2 is configured to protect the cable.

In order not to affect the strength and pressure resistance index of the wall of the pipeline, the cable clamping slot 201 does not occupy the wall thickness of the pipeline 1. In order to protect the cable, the thickness of the clamping slot shoulder 202 is 5.0 mm larger than the outer diameter of the cable, so that the clamping slot shoulder 202 is subjected to earth pressure. The height of the clamping slot shoulder 202 is 2.0 mm higher than the diameter of the clamping slot, so as to ensure that the clamping slot shoulder 202 has enough strength to protect the cable in the clamping slot. For example, when the outer diameter of the cable is 3.0 mm, the clamping slot shoulder 202 is 3.2 mm higher than the outer wall of the pipeline.

Each of both ends of the cable fixing member 2 is cut off by 2.0 mm to form a cut shoulder, so that the cable fixing member 2 is 2.0 mm away from the end of the pipeline 1, and the pipeline is convenient for hot welding. The cut shoulders should not be welded when two pipelines are welded, so that high-temperature plastics are avoided from flowing into the plastic cable clamping slot 201 to affect the cable to be clamped into the cable clamping slot 201 when the pipelines are welded. The colored strips are reserved on the cut shoulders on the outer wall, on both sides of the cable clamping slot 201, of the pipeline 1 by means of wear-resistant and eye-catching color masterbatch, and are configured for aligning the cable clamping slots 201 before the pipelines are welded.

In addition, the pipeline structure can also be made of metal materials. For example, the pipeline 1 is made of steel, the cable fixing member 2 is made of plastics, and the cable fixing member 2 with a clamping slot is bonded on the outer wall of the metal pipeline 1.

Embodiment II

Figure 3:
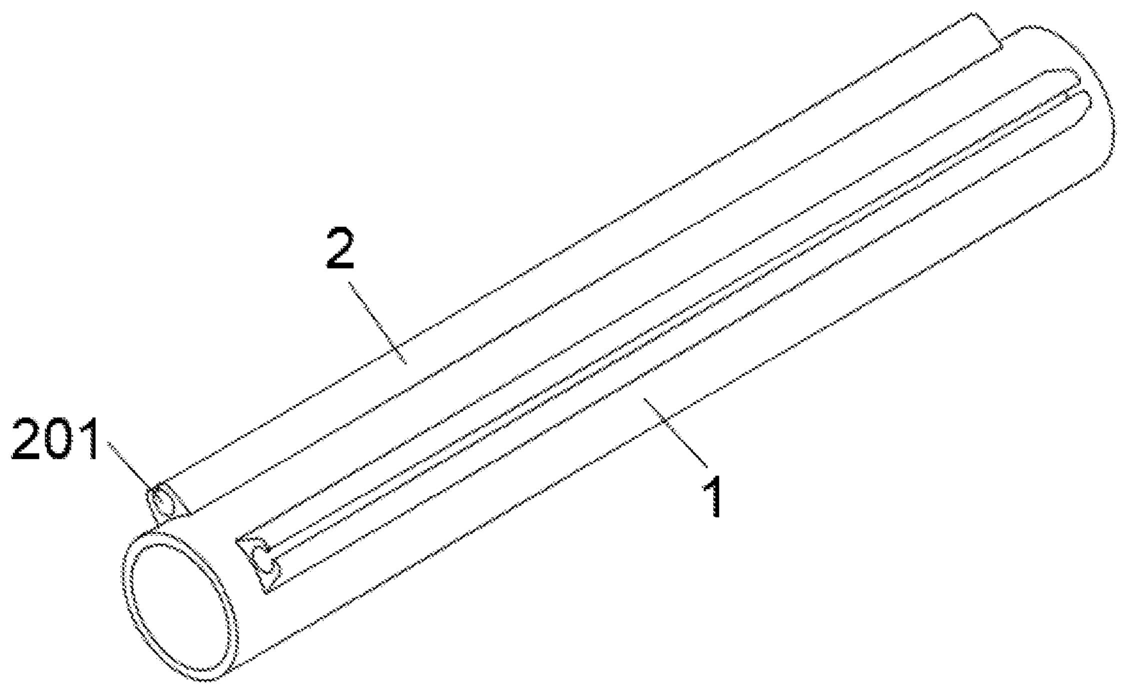
FIG. 3 is a stereoscopic structural schematic diagram of embodiment II according to the present disclosure.

The number and positions of the cable fixing members 2 are improved in the embodiment on the basis of embodiment I. As shown in FIG. 3, two cable fixing members 2 are connected to the pipeline 1 in the circumferential direction of the pipeline 1, and the two cable fixing members 2 are symmetrically arranged at the left shoulder and the right shoulder of the pipeline 1. According to the embodiment, cables can be arranged at both the left shoulder and the right shoulder of the pipeline 1, and cables with different functions can be arranged separately to prevent confusion, and also facilitate later maintenance and replacement.

Embodiment III

Figure 4:
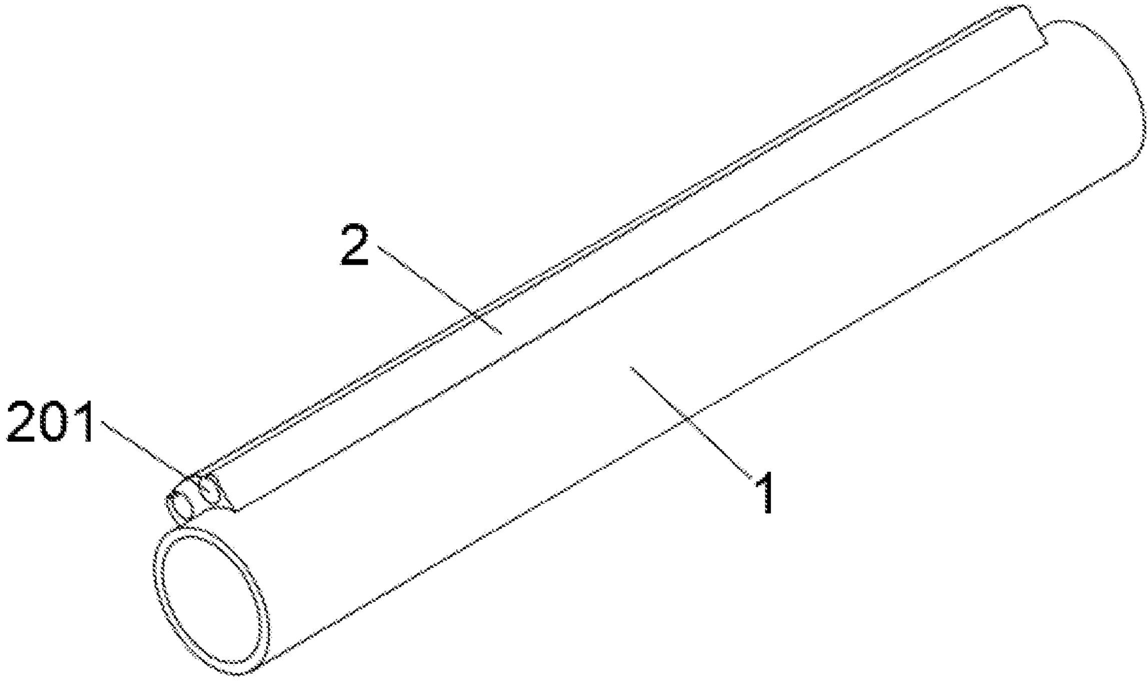
FIG. 4 is a stereoscopic structural schematic diagram of embodiment III according to the present disclosure.
Figure 5:
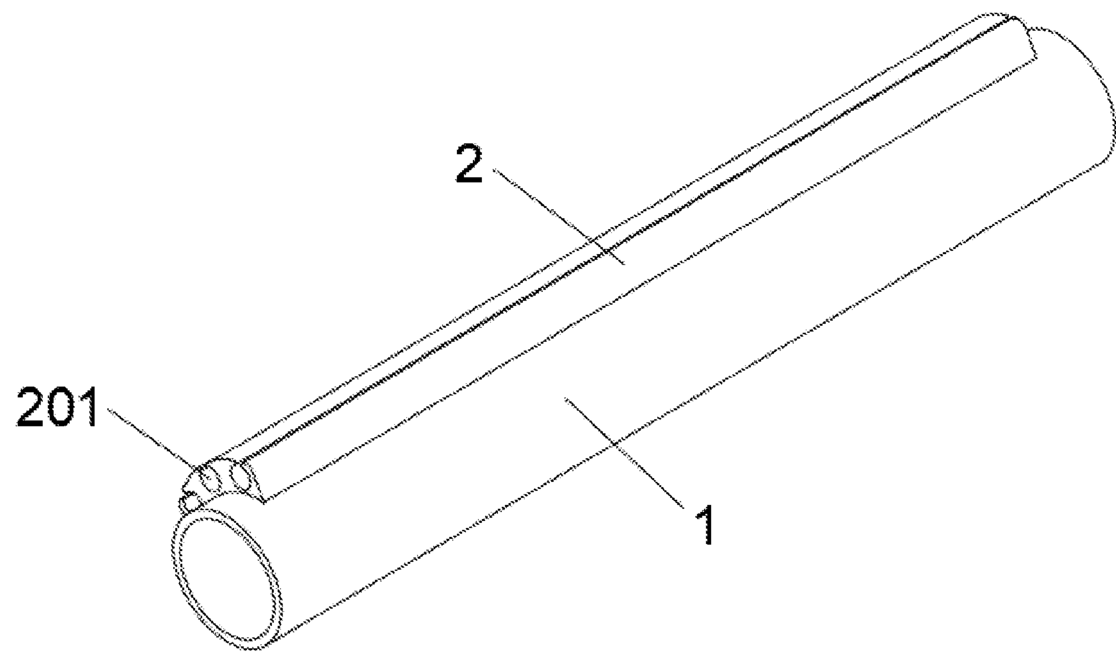
FIG. 5 is a stereoscopic structural schematic diagram of embodiment III, in another form, according to the present disclosure.

The number of the cable clamping slots 201 in the cable fixing member 2 is improved in the embodiment on the basis of the embodiment I. As shown in FIG. 4, two cable clamping slots 201 are formed in the cable fixing member 2 in the embodiment to fix two cables at the same time. As shown in FIG. 5, three cable clamping slots 201 are formed in the cable fixing member 2 in the embodiment to fix three cables at the same time.

In addition, the number of the cable clamping slots 201 in the cable fixing member 2 may be set according to actual needs, and two or more than two cable clamping slots 201 may be formed in the cable fixing member 2, which is not limited to the case described in the embodiment.

The embodiments described above only describe the preferred manner of the present disclosure and do not limit the scope of the present disclosure, and various modifications and improvements made to the technical solution of the present disclosure by those skilled in the art will fall within the scope of protection as determined by the claims of the present disclosure without departing from the spirit of the design of the present disclosure.

What is claimed is:

1. A pipeline structure with a cable fixing function, comprising:

a pipeline (1); and at least one cable fixing member (2) arranged on an outer wall of the pipeline (1), wherein:

each of the at least one cable fixing member (2) is in a strip shape and extends along an axial direction of the pipeline (1);

each of the at least one cable fixing member (2) is formed with a cable clamping slot (201) extending along the axial direction and a clamping slot shoulder (202) surrounding the cable clamping slot (201);

the cable clamping slot (201) is configured as a major-arc shaped clamping slot having an opening;

an inner diameter of the major-arc shaped clamping slot is configured to be 1.0 mm larger than an outer diameter of a cable to be received in the cable clamping slot, and a width of the opening is configured to be 0.5 mm smaller than the outer diameter of the cable to be received in the cable clamping slot; and a thickness of the clamping slot shoulder (202) is configured to be 5.0 mm larger than the outer diameter of the cable to be received in the cable clamping slot, and a height of the clamping slot shoulder (202) is configured to be 2.0 mm higher than a diameter of the cable clamping slot (201).

2. The pipeline structure according to claim 1, wherein both ends of the outer wall of the pipeline (1) are provided with colored strips and a width of each of the colored strips is 1.0 mm.

3. The pipeline structure according to claim 1, wherein the at least one cable fixing member (2) comprises a plurality of cable fixing members (2), the plurality of cable fixing members (2) are distributed on the pipeline (1) in a circumferential direction of the pipeline (1), and are arranged on the pipeline (1) at a plurality of angular positions of the pipeline (1), respectively.

4. The pipeline structure according to claim 3, wherein a cross section of each of the plurality of cable fixing members (2) is in a trapezoid shape.

5. The pipeline structure according to claim 1, wherein each of two ends of the cable fixing member (2) is spaced 2.0 mm apart from a corresponding end of the pipeline (1).

* * * * *